(12) United States Patent
Jarmon

(10) Patent No.: US 11,370,714 B2
(45) Date of Patent: Jun. 28, 2022

(54) INTEGRAL CERAMIC MATRIX COMPOSITE FASTENER WITH POLYMER RIGIDIZATION

(71) Applicant: United Technologies Corporation, Farmington, CT (US)

(72) Inventor: David C. Jarmon, Kensington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 133 days.

(21) Appl. No.: 16/124,303

(22) Filed: Sep. 7, 2018

(65) Prior Publication Data
US 2019/0010829 A1  Jan. 10, 2019

Related U.S. Application Data

(62) Division of application No. 14/686,842, filed on Apr. 15, 2015, now Pat. No. 10,371,011.

(Continued)

(51) Int. Cl.
*B28B 1/00* (2006.01)
*B28B 11/12* (2006.01)
(Continued)

(52) U.S. Cl.
CPC .............. *C04B 35/80* (2013.01); *B28B 1/001* (2013.01); *B28B 1/002* (2013.01); *B28B 11/12* (2013.01);
(Continued)

(58) Field of Classification Search
CPC ... F01D 5/00; F01D 9/00; F01D 11/00; F01D 25/00; F01D 25/005; F01D 25/243;
(Continued)

(56) References Cited

U.S. PATENT DOCUMENTS 4,902,326 A    2/1990  Jarmon
5,310,434 A *  5/1994  Vives ............... F16B 19/04
                                              156/92

(Continued)

FOREIGN PATENT DOCUMENTS

EP    1367037 A2   12/2003
EP    2543826 A2    1/2013
FR    2694553 A1    2/1994

OTHER PUBLICATIONS

Gries et al. "Textile Reinforcement Structures." in: Krenkel, W., Ceramic Matrix Composites (Weinheim, Wiley, 2008), pp. 21-47 (Year: 2008).*

(Continued)

*Primary Examiner* — Jacob J Cigna
(74) *Attorney, Agent, or Firm* — Carlson, Gaskey & Olds, P.C.

(57) ABSTRACT

A gas turbine engine component includes a gas turbine engine component body formed of a ceramic matrix composite material having at least one fastener integrally formed with the gas turbine engine component body as a single-piece structure. The gas turbine engine component body initially comprises a rigidized preform structure formed from a polymer based material. The at least one fastener connects the gas turbine engine component body to an engine support structure.

20 Claims, 2 Drawing Sheets

Related U.S. Application Data

(60) Provisional application No. 61/990,264, filed on May 8, 2014.

(51) Int. Cl.

| | | |
|---|---|---|
| *C04B 35/01* | (2006.01) | |
| *C04B 35/565* | (2006.01) | |
| *C04B 35/571* | (2006.01) | |
| *C04B 35/573* | (2006.01) | |
| *C04B 35/622* | (2006.01) | |
| *C04B 35/634* | (2006.01) | |
| *C04B 35/638* | (2006.01) | |
| *C04B 35/64* | (2006.01) | |
| *C04B 35/76* | (2006.01) | |
| *C04B 35/80* | (2006.01) | |
| *C04B 35/83* | (2006.01) | |
| *C04B 37/00* | (2006.01) | |
| *D03D 25/00* | (2006.01) | |
| *F01D 25/00* | (2006.01) | |
| *F01D 25/24* | (2006.01) | |
| *F01D 25/28* | (2006.01) | |
| *F01D 11/00* | (2006.01) | |
| *F01D 25/30* | (2006.01) | |
| *F23R 3/00* | (2006.01) | |
| *F23R 3/28* | (2006.01) | |
| *F23R 3/60* | (2006.01) | |
| *F01D 5/00* | (2006.01) | |
| *F01D 9/00* | (2006.01) | |
| *F02K 1/82* | (2006.01) | |
| *F02C 7/28* | (2006.01) | |

(52) U.S. Cl.
CPC ............ *C04B 35/01* (2013.01); *C04B 35/565* (2013.01); *C04B 35/571* (2013.01); *C04B 35/573* (2013.01); *C04B 35/62227* (2013.01); *C04B 35/634* (2013.01); *C04B 35/638* (2013.01); *C04B 35/64* (2013.01); *C04B 35/76* (2013.01); *C04B 35/83* (2013.01); *C04B 37/001* (2013.01); *D03D 25/005* (2013.01); *F01D 5/00* (2013.01); *F01D 9/00* (2013.01); *F01D 11/00* (2013.01); *F01D 25/00* (2013.01); *F01D 25/005* (2013.01); *F01D 25/243* (2013.01); *F01D 25/246* (2013.01); *F01D 25/28* (2013.01); *F01D 25/30* (2013.01); *F02C 7/28* (2013.01); *F02K 1/822* (2013.01); *F23R 3/002* (2013.01); *F23R 3/007* (2013.01); *F23R 3/283* (2013.01); *F23R 3/60* (2013.01); *C04B 2235/48* (2013.01); *C04B 2235/5208* (2013.01); *C04B 2235/5244* (2013.01); *C04B 2235/5248* (2013.01); *C04B 2235/5252* (2013.01); *C04B 2235/5256* (2013.01); *C04B 2235/612* (2013.01); *C04B 2235/614* (2013.01); *C04B 2235/616* (2013.01); *C04B 2237/38* (2013.01); *C04B 2237/385* (2013.01); *C04B 2237/60* (2013.01); *C04B 2237/61* (2013.01); *C04B 2237/80* (2013.01); *C04B 2237/84* (2013.01); *F05D 2220/323* (2013.01); *F05D 2230/10* (2013.01); *F05D 2230/314* (2013.01); *F05D 2240/91* (2013.01); *F05D 2260/30* (2013.01); *F05D 2260/31* (2013.01); *F05D 2300/6033* (2013.01); *F23M 2900/05004* (2013.01); *Y02T 50/60* (2013.01)

(58) Field of Classification Search
CPC ........ F01D 25/246; F01D 25/28; F01D 25/30; F02C 7/28; F02K 1/822; F05D 2220/323; F05D 2230/10
See application file for complete search history.

(56) References Cited

U.S. PATENT DOCUMENTS

| | | |
|---|---|---|
| 5,314,282 A | 5/1994 | Murphy et al. |
| 6,042,315 A | 3/2000 | Miller et al. |
| 6,045,310 A | 4/2000 | Miller et al. |
| 6,407,022 B1 | 6/2002 | Sandhage et al. |
| 6,830,437 B2 | 12/2004 | Cairo et al. |
| 7,932,972 B2 | 4/2011 | Oh |
| 7,967,562 B2 | 6/2011 | Frost et al. |
| 7,988,395 B2 | 8/2011 | Steffier |
| 8,556,531 B1 | 10/2013 | Bird et al. |
| 8,607,577 B2 | 12/2013 | Ruberte Sanchez et al. |
| 2010/0028645 A1 | 2/2010 | Maguire et al. |
| 2010/0151183 A1 | 6/2010 | Davis et al. |
| 2010/0242486 A1* | 9/2010 | Jarmon ............... B64C 1/38 60/768 |
| 2011/0027098 A1 | 2/2011 | Noe et al. |
| 2011/0219775 A1 | 9/2011 | Jarmon |
| 2012/0055609 A1 | 3/2012 | Blanchard et al. |
| 2012/0163978 A1 | 6/2012 | Darkins, Jr. et al. |
| 2012/0168121 A1 | 7/2012 | Jarmon |
| 2012/0328366 A1 | 12/2012 | Jarmon et al. |
| 2013/0004715 A1 | 1/2013 | Jarmon et al. |
| 2013/0011471 A1 | 1/2013 | Manku et al. |
| 2014/0050893 A1 | 2/2014 | Paige et al. |
| 2014/0199174 A1 | 7/2014 | Roberts, III et al. |
| 2014/0272274 A1 | 9/2014 | Lazur |
| 2014/0272310 A1 | 9/2014 | Lazur et al. |
| 2016/0177745 A1 | 6/2016 | Uskert et al. |

OTHER PUBLICATIONS

European Search Report for European Patent Application No. 15166924.9 dated Sep. 17, 2015.

* cited by examiner

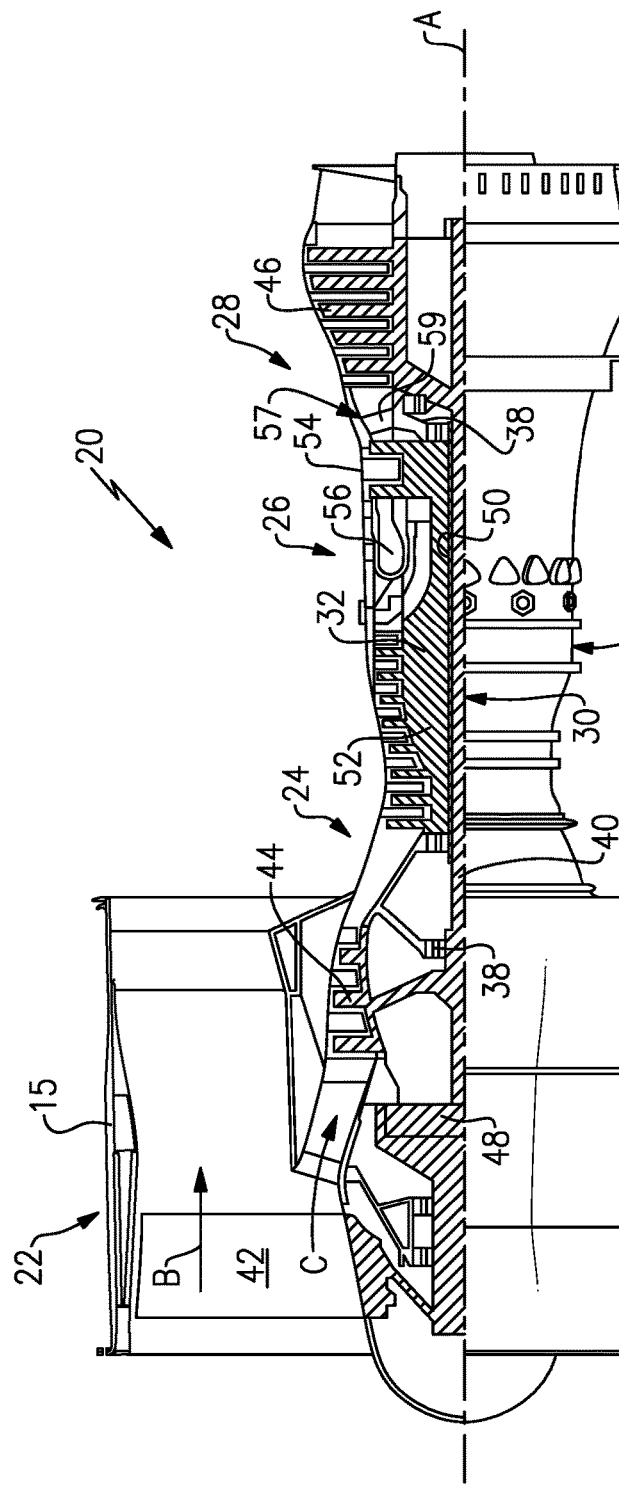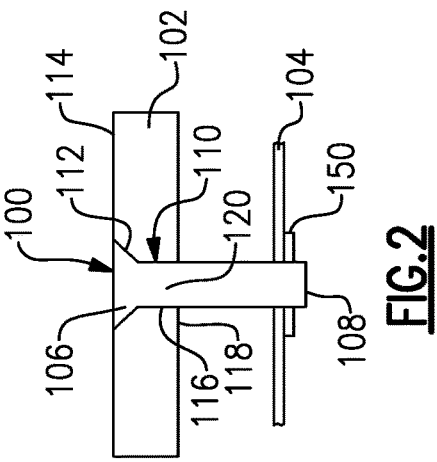

INTEGRAL CERAMIC MATRIX COMPOSITE FASTENER WITH POLYMER RIGIDIZATION

CROSS-REFERENCE TO RELATED APPLICATIONS

This application is a divisional of U.S. patent application Ser. No. 14/686,842, filed Apr. 15, 2015, which claims priority to U.S. Provisional Patent Application No. 61/990,264, filed May 8, 2014.

BACKGROUND OF THE INVENTION

Ceramic matrix composite (CMC) components are being developed for use in aerospace and industrial gas turbine engine applications. As known, these CMC components need to be attached to an underlying engine support structure. Various attachment methods have been utilized to attach CMC components, such as combustor liners and nozzle seals for example, to underlying metal engine structures.

In one example, a "T" Joint is formed as part of the CMC component itself. The CMC component is formed to include an integrally extending protrusion that serves as an attachment leg to connect to the metal support structure. One disadvantage with this type of attachment is the low through-thickness and interlaminar properties of the CMC, such as through-thickness tensile strength and interlaminar shear strength.

In another example, a CMC fastener is used to connect the CMC component to the metal support structure. The CMC fastener is machined from a flat CMC panel and is inserted into an opening formed within the CMC component to secure the component to the metal support structure. Disadvantages with this configuration include leakage around the fastener head, processing expenses, and difficulty in controlling tolerances between the fastener and the fastener opening. Rounded braided fasteners have also been used instead of the flat panel fasteners but experience similar difficulties.

SUMMARY OF THE INVENTION

In a featured embodiment, a gas turbine engine component includes a gas turbine engine component body formed of a ceramic matrix composite material having at least one fastener integrally formed with the gas turbine engine component body as a single-piece structure. The gas turbine engine component body initially comprises a rigidized preform structure formed from a polymer based material. The at least one fastener connects the gas turbine engine component body to an engine support structure.

In another embodiment according to the previous embodiment, the rigidized preform structure has an opening to receive the fastener, and wherein the fastener initially comprises a separate woven fastener formed from a fiber based material, and wherein the woven fastener is received within the opening of the rigidized preform and subsequently infiltrated with a matrix material to form the single-piece structure as a finished component.

In another embodiment according to any of the previous embodiments, the rigidized preform structure includes the polymer based material prior to forming the opening.

In another embodiment according to any of the previous embodiments, the single-piece structure that forms the finished component does not include the polymer based material.

In another embodiment according to any of the previous embodiments, the rigid perform structure is oxidized to remove the polymer based material prior to being infiltrated with the matrix material.

In another embodiment according to any of the previous embodiments, the fastener initially comprises a separate woven fastener formed from a fiber based material, and wherein fibers from the rigidized preform structure spread into a weave of the woven fastener prior to being infiltrated with the matrix material.

In another embodiment according to any of the previous embodiments, the matrix material is infiltrated into the fibers of the rigidized preform structure and the weave of the fiber fastener to form the ceramic matrix composite component with the fastener as a monolithic structure.

In another embodiment according to any of the previous embodiments, the ceramic matrix composite component comprises a nozzle liner connected to the engine support structure with the fastener.

In another embodiment according to any of the previous embodiments, the gas turbine engine component body comprises one of a combustion liner or nozzle seal.

In another embodiment according to any of the previous embodiments, the engine support structure comprises a metal plate.

In another embodiment according to any of the previous embodiments, the ceramic matrix composite component and the at least one fastener are a monolithic structure.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 1 is a schematic representation of one example of a gas turbine engine.

FIG. 2 schematically illustrates an integral CMC fastener used to connect two gas turbine engine structures together.

DETAILED DESCRIPTION

Figure 3:
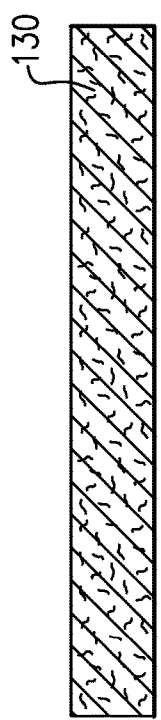
FIG. 3 is a schematic view of a method step.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second.

FIG. 2 shows an integral ceramic matrix composite (CMC) fastener 100 that is used to connect a first gas turbine engine component 102 to a second gas turbine engine component 104. As discussed above, exhaust from combustion flows through the high pressure turbine and low pressure turbine prior to leaving the gas turbine engine via the exhaust nozzle. The exhaust exits the nozzle at very high temperatures, and as such, the nozzle will benefit if lined with ceramic matrix composite liners. In one example, the first gas turbine engine component 102 comprises the CMC liner and the second gas turbine engine component 104 comprises an underlying engine support structure, such as a metal backing plate for example.

In one example application, the CMC fastener 100 is used to connect the CMC liner 102 to the engine support structure 104. This is merely one example, and it should be understood that the CMC fastener could be integrally formed with other CMC gas turbine engine components as needed, such as nozzle seals for example.

In the example shown in FIG. 2, the fastener 100 includes a head portion 106 and a foot portion 108. The CMC liner 102 includes an opening 110 that is machined to receive the fastener 100. In one example, the opening has a wide portion 112 at one surface 114 of the CMC liner 102 and a narrow portion 116 at an opposite surface 118 of the CMC liner 102. A method of fabricating CMC fasteners 100 is used to form the CMC liner 102 and fastener 100 as a single-piece structure such that there are no gaps or openings between the head portion 106 and the wide portion 112 of the opening 110. Also, there are no gaps between the narrow portion 116 of the opening 110 an associated body portion 120 of the fastener 100. The method provides a finished gas turbine engine component that has good interlaminar properties, does not enable gas leakage, does not have tolerance problems, and has minimal increase to component expense.

FIGS. 3-8 show the steps of the method. First, as shown in FIG. 3, a preform 130 is woven to form the gas turbine engine component 102 to have the desired architecture. For example, the preform 130 is woven to provide a combustor liner as described above. This weaving step is done by standard CMC fabrication methods, such as 2-D fabric lay-up or 3-D weaving for example. The woven preform 130 has the desired shape but does not comprise a rigid structure that is capable of being machined.

Figure 4:
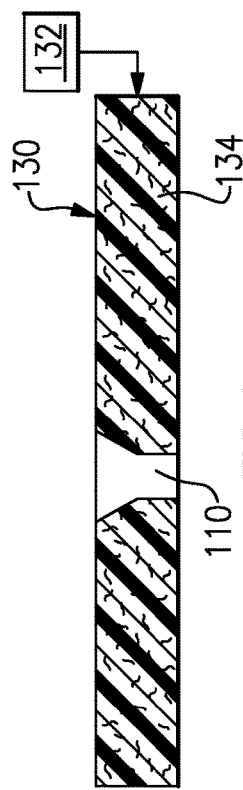
FIG. 4 is a schematic view of another method step.

Next, as shown in FIG. 4, the preform 130 is rigidized with a polymer based material 132 to provide a rigid preform structure 134. One example of a polymer based material that could be used is Epon 862; however, other polymers could also be used. This rigid preform structure 134 can then be machined to form one or more openings 110. The opening 110 needs to be wider at the top than the bottom to prevent the fastener 100 from pulling through as described above. The shape of the opening 110 can be varied to fit the fastener 100, for example, a hole can be machined for round fasteners and slots can be machined for strip fasteners.

Figure 5:
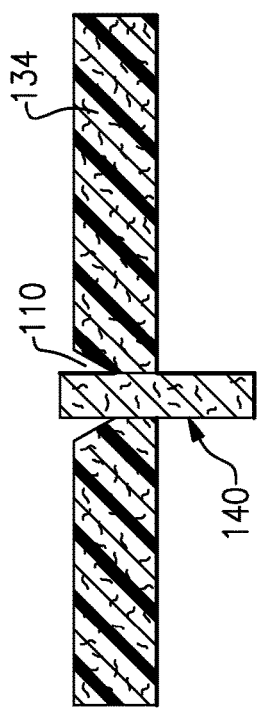
FIG. 5 is a schematic view of another method step.

Next, as shown in FIG. 5, a fastener body 140 is woven from fibers. One example method for weaving the fastener body 140 is tri-axial braiding. This is a good method of weaving the fastener body 140 because it produces a fiber architecture with fibers in axial and off-axis directions. The braid can be round or rectangular, for example. The woven fastener body 140 is then inserted into the opening 110.

Optionally, a ceramic matrix composite (CMC) fastener with a quasi-two-dimensional (2-D) fabric lay-up could also be used, such as that disclosed in U.S. Pat. No. 6,045,310 which is assigned to the assignee of the present invention and which is hereby incorporated by reference. Because the 2-D lay-up will be difficult to keep intact during subsequent steps, fully or partially consolidated CMC fasteners will have to be preprocessed and inserted into the component preform in the step shown in FIG. 5.

Figure 6:
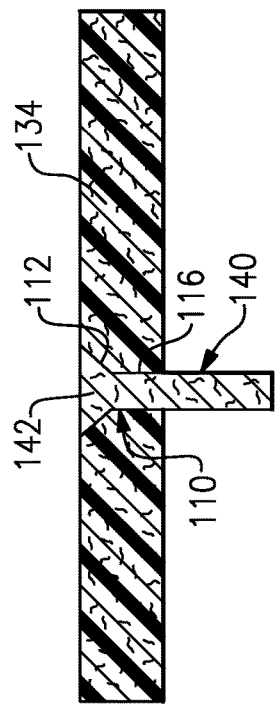
FIG. 6 is a schematic view of another method step.

The fastener body 140 can be formed to have a uniform shape along its length as shown in FIG. 5, or can be formed to have an enlarged head portion 142 as shown in FIG. 6. If the FIG. 5 configuration is used, filler material can be inserted into a top of the woven fastener to prevent the fastener from pulling through the fastener opening 110. However, if the woven fastener already has the enlarged head portion 142, this will not be necessary, as the head portion 142 will rest within the wider portion 112 of the opening 110 and not fall through the narrow portion 116 (FIG. 6).

Figure 7:
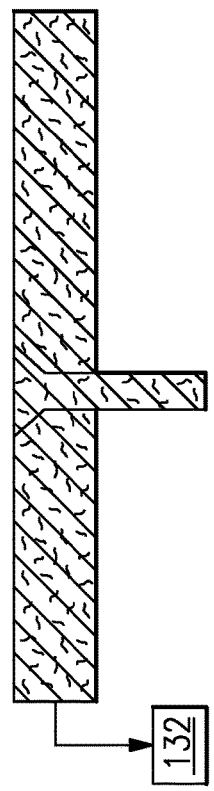
FIG. 7 is a schematic view of another method step.

Next, as shown in FIG. 7, the polymer that was applied in the step shown in FIG. 4 is oxidized out of the rigid preform structure 134. The fibers from the CMC preform structure 134 will spread into the fastener weave. This assembly may have to be inside tooling during this oxidizing step.

Figure 8:
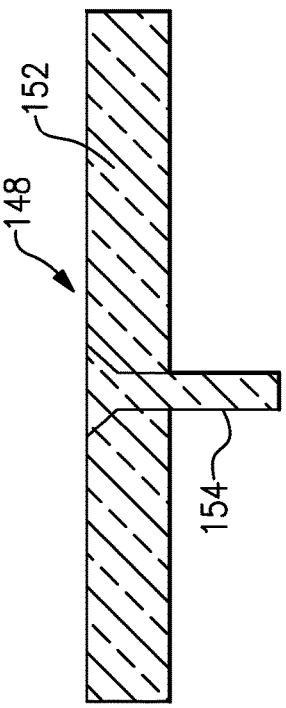
FIG. 8 is a schematic view of another method step.

Next, as shown in FIG. 8, the standard CMC processing is completed to form a ceramic matrix composite component with an integral fastener 148. This provides a single-piece gas turbine engine component and integral fastener without any gaps between a head portion of the fastener and the ceramic matrix composite component (FIG. 2). The CMC processing involves the infiltration of a matrix material between the fibers. The matrix infiltration can be accomplished by various methods including chemical vapour infiltration (CVI), polymer impregnation and pyrolysis (PIP), slurry infiltration, and glass transfer molding. CVI and PIP processing are typically used to fabricate the following CMCs: silicon carbide fiber reinforced silicon carbide (SiC/SiC), carbon fiber reinforced silicon carbide (C/SiC), and carbon fiber reinforced carbon (C/C). Slurry processing is typically used to fabricate oxide fiber reinforce oxide (oxide/oxide) CMCs. Glass transfer molding is typically used to fabricate carbon, silicon carbide, and/or oxide fiber reinforced glass CMCs. Optionally, any protective coatings can also be applied during final CMC processing.

Finally, after CMC processing has been completed, the fastener foot portion 108 (FIG. 2) may be machined as needed. For example, the foot portion 108 could be machined to receive a connecting structure such as fastener attachment nuts 150. The single-piece gas turbine engine component comprises a monolithic structure 152 that comprises the component and an attachment extension portion 154 (FIG. 8) extending outwardly from one side of the monolithic structure 152 that can be secured to the engine underlying structure 104 with the nut 150.

There are several benefits of this invention. The monolithic structure eliminates the gap between the fasteners and fastener slots or openings, which in turn eliminates potential passages for gas leakage. Further, if coatings are to be used, such as an environmental Barrier coating (EBC) for example, the EBC will be applied to a surface without gaps. This will help prevent spalling of the EBC.

Another benefit is that the fibers from the CMC component preform will spread into the fastener weave after polymer is oxidatively removed. Thus, fibers will bridge the fastener/component interface. Also, as the fastener is processed as part of the CMC component, tolerance control between the fastener and fastener opening is no longer an issue.

Additionally, the expense of fabricating the integral fastener is significantly less than fabricating non-integral fasteners because the method does not require: 1) separate CMC processing of the fastener, 2) machining of CMC fasteners, and 3) machining CMC fastener openings.

Another advantage with the inventive method is that the fiber architecture of the fastener can be controlled independent of the component fiber architecture. For example, three-dimensional (3-D) fiber architectures, such as tri-axial braids, are well suited for this invention because they maintain their shape during processing.

Finally, while the subject invention discloses methods for forming an integral fastener using a polymer based material, applicant's U.S. application No. 61/990,281 discloses alternate methods forming integral fasteners.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
   a gas turbine engine component body formed of a first material comprising a ceramic matrix composite material, and wherein the gas turbine engine component body comprises a first woven structure;
   at least one fastener comprising a fastener body extending from a head portion to a foot portion, wherein the fastener body is comprised of a second woven structure that is woven separate from the first woven structure, and wherein the head portion is defined by a first dimension and the foot portion is defined by a second dimension that is less than the first dimension;
   the at least one fastener at least partially received within the gas turbine engine component body such that the head portion is flush with an outer surface of the gas turbine engine component body;
   wherein fibers from the first woven structure extend into a fastener weave of the second woven structure such that the fibers bridge a fastener/component interface;
   the at least one fastener integrally formed with the gas turbine engine component body as a single-piece structure, wherein the gas turbine engine component body comprises a rigidized preform structure formed from a polymer based material that is oxidized out of the rigid preform structure; and
   an engine support structure, wherein the at least one fastener connects the gas turbine engine component body to the engine support structure.

2. The gas turbine engine component according to claim 1 wherein the ceramic matrix composite component and the at least one fastener are a monolithic structure.

3. The gas turbine engine component according to claim 1 wherein the foot portion extends beyond an opposite outer surface of the gas turbine engine component body such that there are no gaps or openings between the head portion of the second woven structure and the first woven structure.

4. The gas turbine engine component according to claim 1 including an environmental barrier coating applied to the gas turbine engine component body.

5. The gas turbine engine component according to claim 1 wherein the second woven structure comprises a 2-D fabric lay-up or a 3-D weaving that is configured to provide a rigidized, oxidized preform structure, and wherein the first woven structure comprises a braided body.

6. The gas turbine engine component according to claim 1 wherein the gas turbine engine component body comprises one of a combustion liner or nozzle seal.

7. The gas turbine engine component according to claim 6 wherein the engine support structure comprises a metal plate.

8. The gas turbine engine component according to claim 1 wherein the fastener body is comprised of a woven fiber material to provide a woven fastener that is woven from fibers to provide the fastener weave, and wherein fibers from the rigidized preform structure extend into the fastener weave of the woven fastener such that the fibers bridge the fastener/component interface.

9. The gas turbine engine component according to claim 8 wherein the foot portion comprises a machined surface and including a connecting structure that is received on the machined surface.

10. The gas turbine engine component according to claim 9 wherein the single-piece structure comprises the gas turbine engine component body and an attachment extension portion extending outwardly from the opposite side of the gas turbine engine component body to terminate at the foot portion which receives the connecting structure.

11. The gas turbine engine component according to claim 1 wherein the rigidized preform structure receives the at least one fastener, and wherein the second woven structure is formed from a woven fiber material that is infiltrated with a matrix material to form the single-piece structure as a finished component product.

12. The gas turbine engine component according to claim 11 wherein the single-piece structure that forms the finished component product does not include the polymer based material.

13. The gas turbine engine component according to claim 11 wherein the rigid perform structure is oxidized to remove the polymer based material prior to being infiltrated with the matrix material.

14. The gas turbine engine component according to claim 11 wherein the fibers from the first woven structure spread into the fastener weave of the second woven structure prior to being infiltrated with the matrix material.

15. The gas turbine engine component according to claim 14 wherein the matrix material is infiltrated into the fibers of the first woven structure and the fastener weave of the second woven structure to form the ceramic matrix composite component with the fastener body as a monolithic structure.

16. The gas turbine engine component according to claim 15 wherein the ceramic matrix composite component comprises a nozzle liner connected to the engine support structure with the fastener.

17. A gas turbine engine component comprising:
a gas turbine engine component body formed of a ceramic matrix composite material, and wherein the gas turbine engine component body comprises a first woven structure;
at least one fastener comprising a fastener body extending from a head portion to a foot portion, wherein the fastener body is a second woven structure that is woven separate from the first woven structure, and wherein the head portion is defined by a first dimension and the foot portion is defined by a second dimension that is less than the first dimension;
the gas turbine engine component body receiving the at least one fastener such that the head portion is flush with an outer surface of the gas turbine engine component body;
wherein fibers from the first woven structure extend into a fastener weave of the second woven structure such that the fibers bridge a fastener/component interface
wherein the first woven structure is infiltrated with a matrix material such that the at least one fastener is integrally formed with the gas turbine engine component body as a single-piece structure without any gaps between the head portion of the at least one fastener and the first woven structure; and
an engine support structure, wherein the at least one fastener connects the gas turbine engine component body to the engine support structure.

18. The gas turbine engine component according to claim 17 wherein the second woven structure comprises a woven fastener that is formed from a woven fiber material, and wherein the foot portion of the woven fastener extends beyond an opposite outer surface of the gas turbine engine component body that is infiltrated with the matrix material to form the single-piece structure as a finished component product, and wherein the second woven structure comprises a braided body and the first woven structure comprises a 2-D fabric lay-up or a 3-D weaving.

19. The gas turbine engine component according to claim 17 wherein the at least one fastener comprises a woven fastener that is woven from fibers to provide the fastener weave, and wherein fibers from the first woven structure extend into the fastener weave of the woven fastener such that the fibers bridge the fastener/component interface.

20. A gas turbine engine component comprising:
a gas turbine engine component body formed of a ceramic matrix composite material;
at least one fastener comprising a fastener body extending from a head portion to a foot portion, wherein the fastener body is a first woven structure comprised of a woven fiber material, and wherein the head portion is defined by a first dimension and the foot portion is defined by a second dimension that is less than the first dimension;
the gas turbine engine component body receiving the at least one fastener such that the head portion is flush with an outer surface of the gas turbine engine component body;
wherein the gas turbine engine component body comprises a second woven structure that is different from the first woven structure and is infiltrated with a matrix material such that the at least one fastener is integrally formed with the gas turbine engine component body as a single-piece structure without any gaps between the head portion of the fastener and the second woven structure;
an engine support structure, wherein the at least one fastener connects the gas turbine engine component body to the engine support structure;
wherein the first woven structure comprises a woven fastener that is formed from the woven fiber material, and wherein the foot portion of the woven fastener extends beyond an opposite outer surface of the gas turbine engine component body that is infiltrated with the matrix material to form the single-piece structure as a finished component product;

wherein the woven fastener is woven from fibers to provide a fastener weave, and wherein fibers from the second woven structure extend into the fastener weave of the woven fastener such that the fibers bridge a fastener/component interface; and wherein the second woven structure comprises a 2-D fabric lay-up or a 3-D weaving that is configured to provide a rigidized, oxidized preform structure, and wherein the first woven structure comprises a tri-axial braided body.

* * * * *